July 5, 1966 J. RABINOW 3,259,885

READING MACHINE WITH SERIAL SYNCHRONIZED STORAGE

Filed Sept. 25, 1963 2 Sheets-Sheet 1

INVENTOR
Jacob Rabinow
BY Joseph A. Genovese & Max L. Libman
ATTORNEYS

July 5, 1966 J. RABINOW 3,259,885

READING MACHINE WITH SERIAL SYNCHRONIZED STORAGE

Filed Sept. 25, 1963 2 Sheets-Sheet 2

INVENTOR

Jacob Rabinow

BY Joseph A. Genovese & Max L. Libman

ATTORNEYS

United States Patent Office 3,259,885
Patented July 5, 1966

3,259,885
READING MACHINE WITH SERIAL SYNCHRONIZED STORAGE

Jacob Rabinow, Bethesda, Md., assignor, by mesne assignments, to Control Data Corporation, Minneapolis, Minn., a corporation of Minnesota
Filed Sept. 25, 1963, Ser. No. 311,350
4 Claims. (Cl. 340—146.3)

This invention relates to reading machines and the principles of my invention apply to both magnetic and optical character reading. However, in the interest of brevity the following description is concerned with optical, rather than magnetic, character reading.

At this stage in the development of reading machines, several kinds are commercially available, and numerous others are disclosed in patents and in other publications. Most machines, either constructed or disclosed in publications, are inherently expensive and complex. For many applications, the cost is prohibitive.

One of the principal objects of my invention is to provide an inherently inexpensive and simple reading machine.

A machine in accordance with my invention uses a simple scanner mechanically synchronized with a movable storage medium which serially records either electrostatic or electromagnetic signals corresponding to the scanner outputs. A feature of my machine is its unique means to readout the serial scan-information recorded on the medium.

By serially recording the scan data in a manner such that the information extracted by the scanner is recorded in a line made of colinear scan traces (as though the character and its background were disected into vertical slices and arranged end-to-end) the familiar horizontal and vertical registration problems are overcome in the following way. When the unknown character and its background (scan data pertaining thereto) is recorded in the above serial manner, sooner or later the scan information (defining the scanned character) will pass a read assembly capable of deriving signals therefrom by which the identity of the unknown character can be ascertained. Thus, it does not matter whether the scanned character is centered in the field examined by the scanner. The only requirement is that the entire character be located in (or pass through) the field examined by the scanner.

Most scanners (and/or memory devices) do not extract (or record) all of the available information pertaining to a character and its background. For example, in a comparatively simple machine, an aperture disc may be used in a manner such that the scan traces of successive apertures overlap thereby completely covering the entire character area. However, to my knowledge the scanner output signals are generally "sampled" by clock gating means so that the recorded signals are merely samples taken regularly along each scan trace (line). The reason for this is to make the scanner outputs compatible with digital logic devices, at the expense of the necessary gating and clock circuitry and also the expense of readily available information from the character area.

In contrast, I can use the scanner to extract all of the character data from an unknown character in a continuous and complete manner as opposed to sampling points along successive scan lines. It is actually easier to record all of the information (no clock and gating means required), and I have the benefit of a full and complete "image" of the unknown character on the recording medium. My recording has advantages over digital recording on a magnetic tape or drum, where each bit represents a discrete area. Magnetic digital recording is a sampling system. In any sample-scan technique, even a full mosaic photocell scan technique as in Fitch Patent No. 2,682,043, the storage means do not record or otherwise make available all of the character information of the character and its background. Accordingly, in storing the scan information in a "dc" mode as I prefer, the resolution required for reading different fonts, different qualities of print, etc. becomes solely a function of how much of the recorded data that I desire to use.

Notwithstanding the above, my reading machine can use digital recording, particularly in the case of good printing which makes possible "clean" signals in the scanner.

Another object of my invention is to provide a reading machine with simple means for utilizing information recorded in the above manner. My preferred recording medium is a drum or disc, but I can use a tape. In the drum configuration, I read out the serially recorded scan-data during drum rotation, by means of a compact set of reading members adjacent to the drum surface. In the tape embodiment the serial read members are similar except they are not curved to conform to the drum surface.

Another object of my invention is to provide a unique mechanical arrangement in a reading machine, for recording scanner outputs and for extracting information from the recorded data. In one embodiment of my invention I use a scanning disc with a surface provided with a recording medium whereby problems of mechanical synchronism are automatically overcome because the recording surface must always move in synchronism with the scanning.

Other objects and features will become apparent in following the description of the illustrated forms of the invention.

Figures 2, 3, 3A, 3B, 3C, 3D, 4, 5:
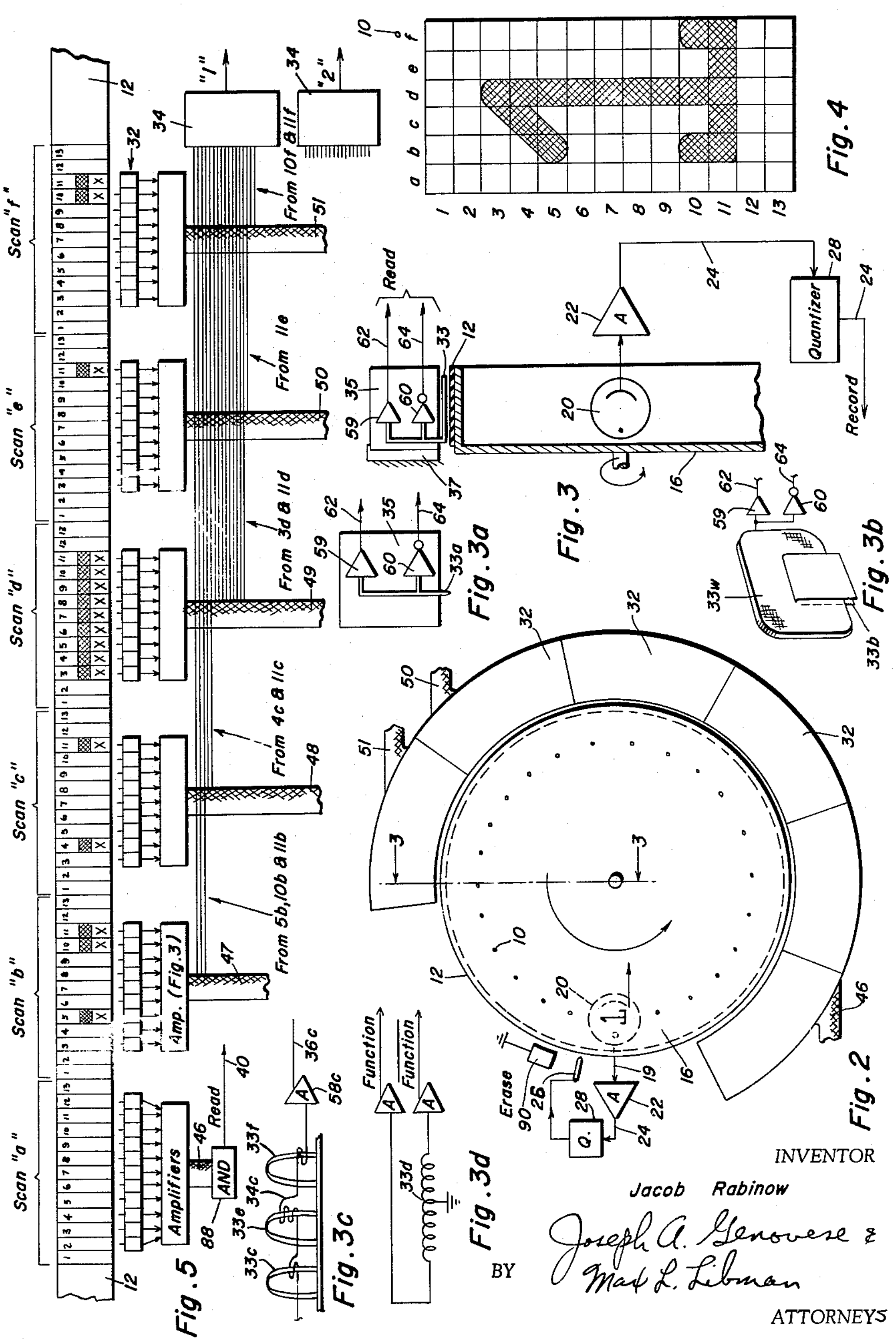
FIGURE 2 is an end view of a mechanically synchronous scanner and recording medium of my reading machine.
FIGURE 3 is a fragmentary sectional view taken on line 3—3 of FIGURE 2.

FIGURE 3*a* is a partially diagrammatic view showing a modification of the readout device of FIGURE 3.

FIGURE 3*b* is a view similar to FIGURE 3*a* but showing a further modification used with magnetic storage.

FIGURE 3*c* is a schematic view showing another modification which greatly simplifies the logic of the machine.

FIGURE 3*d* is a schematic view showing a further modification.

FIGURE 4 is a view of a character on its background area which has been subdivided as a grid to aid in the explanation of the reading machine.

FIGURE 5 is a schematic view showing a development of the surface of the recording medium with references thereon to record signals when scanning the character shown in FIGURE 4.

Figures 1, 5A, 5B, 6, 7, 8:
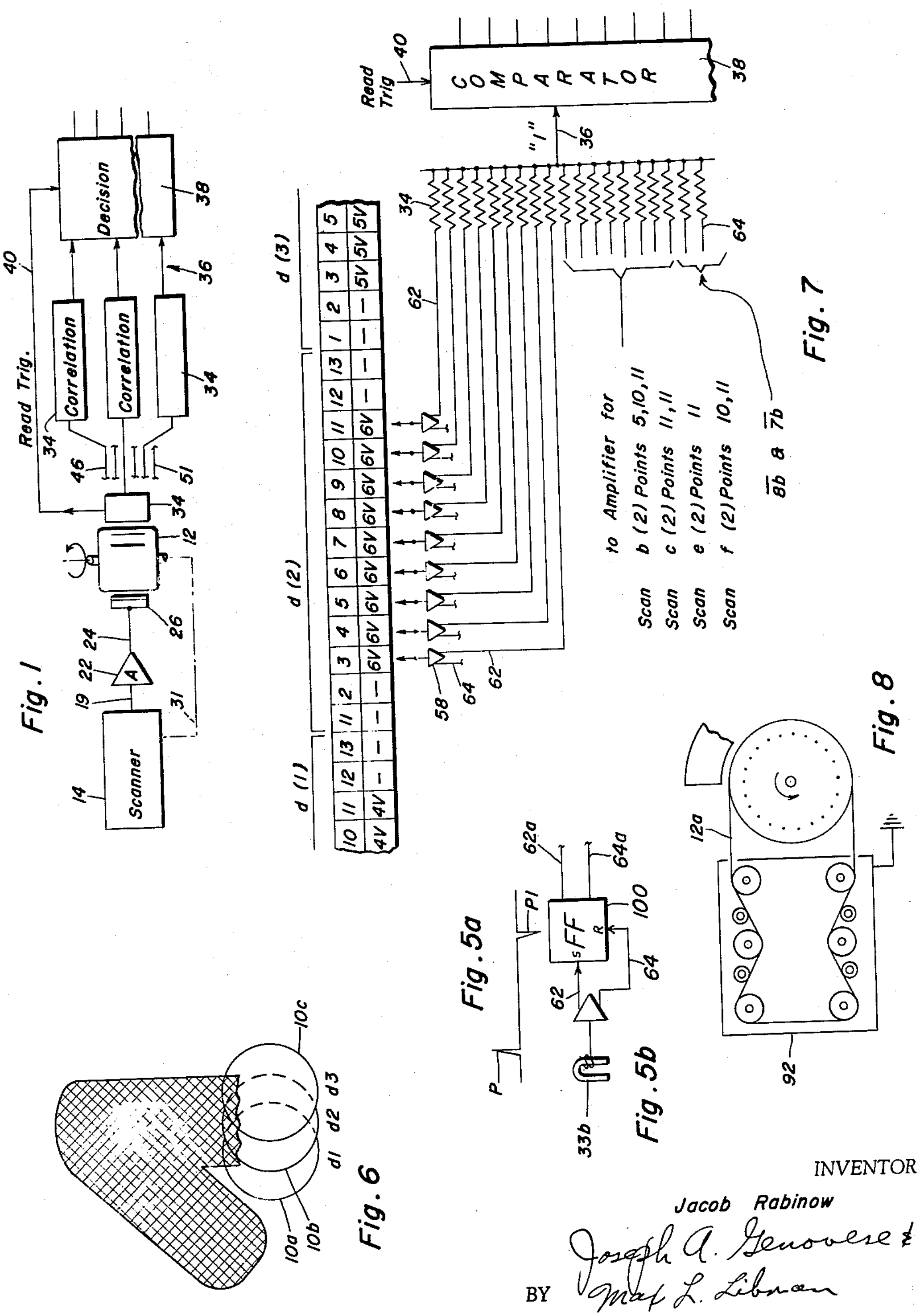
FIGURE 1 is a diagrammatic view showing one arrangement of a recording machine in accordance with my invention.

FIGURE 5*a* and 5*b* are schematic views dealing with the reading of the recorded scan data.

FIGURE 6 is a schematic view showing the relationship of scan elements vertically traversing the image of the character as in actual practice.

FIGURE 7 is a fragmentary schematic view showing the development of a portion of the recording medium and specifically, recorded scan data pertaining to the vertical scans designated in FIGURE 6.

FIGURE 8 is a diagrammatic view showing a modification of the recording medium.

*General description*

In the accompanying drawings FIGURE 4 shows the character "1" on a background area which is subdivided into a grid of 13 horizontal rows (numbered 1–13) and six vertical columns (*a–f*). The character is one of a set of a five-by-nine font, although my invention is not in any way restricted to identifying characters of a single font.

The vertical columns *a–f* inclusive are used to represent vertical scans or scan traces typified by the scan hole 10 at the top of FIGURE 4, but it is important to note at the outset, that in the analog recording embodiments the horizontal divisions 1–13 are merely a convenience for relating the storage of scan data on medium 12 and they do not represent scan samples or samplings usually associated with sample-scan systems that are common in area-scanning reading machines. As I have indicated before, I prefer to scan and record continuously i.e. the information outputs occur as a steady signal during the time that a scan hole vertically traverses each of the slices of the unknown character and its background represented at *a–f* inclusive of FIGURE 4. In FIGURE 4, scans *a–f* represent a more or less ideal case where the scan elements (holes 10) traverse well-defined adjacent slices of the area containing the character. In practice, the vertical scans are as shown in FIGURE 6 where the adjacent scan elements 10*a*, 10*b*, and 10*c* overlap each other. Comparing FIGURES 4 and 6 it is evident that instead of having a single scan element traversing column *d* as in FIGURE 4, there will be more than one scan element defining column *d* as, for example, scan elements *d*1, *d*2, and *d*3 represented by apertures 10*a*, 10*b* and 10*c* of FIGURE 6. Storage of the scan data is fragmentarily shown in FIGURE 7, however, for simplicity the description that follows is primarily based on scan elements *a–f* of FIGURE 4 and their storage (FIGURE 5).

FIGURE 1 shows the general arrangement of my reading machine which is described below. Scanner 14 examines a character, e.g. the "1" in FIGURE 4, and provides a continuous analog signal on line 19 for each scan trace (*a–f*), and the signal level rises and falls during each scan trace in accordance with the optical density of the character area. Line 19 is connected to amplifier 22 whose output line 24 is connected to a record device 26. The record device is associated with recording medium 12 which is shown as a film on a drum rotated in synchronism (shown by dotted line 31) with scanner 14. (In one embodiment, FIGURE 2, the drum and scanning disc are unitary.)

As mentioned before, the scan-data extracted during successive scan traces *a–f* are recorded colinearly as a single serial record on medium 12. Read members 32 are located adjacent to the drum, and these are designed to provide signals on the lines of cables 46, 47 . . . 51 (FIGURE 5) which corresponds to all of the points of the character-area which I desire to investigate. This can be any number depending on drum-diameter and other engineering factors. Selected lines (depending on the shape of the characters) in cables 46–51 are connected to an individual correlation device 34 (FIGURES 1 and 5) for each character of the set which the machine is designed to identify. The correlation signals on lines 36 from correlation devices 34 are connected with a comparator 38 forming the decision section of the machine. Usually, the comparator requires a trigger signal, and this can be developed on line 40 from one of the drum-read member 32 or any other convenient manner.

*Specific description*

FIGURES 2 and 3 show scanner 14 combined with the record and storage device 26 as a single structure driven by the same motor (not shown). This eliminates problems of synchronism between the scanner and storage device which can arise in other mechanical arrangements, even when the scan disc and storage device are welded to the same shaft (due to shaft twist). The scanner is made of disc 16 having a peripheral drum on which recording medium 12 is fixed. In use, the image of each character to be identified is projected onto one face of the scanning disc which rotates at a predetermined speed. The characters can be scanned while they are moved horizontally (by the motion of the document containing the characters) by using a scan-hole pattern as shown in FIGURE 2, or the characters can be scanned while the character images are at rest by interposing an oscillating mirror (or the equivalent) in the optical system, or by indexing the document and using a nipkow hole pattern in the scanning disc.

With the disc scanner, a single photocell 20 is located behind disc 16 (FIGURE 3), and the outputs from the photocell on line 19 are amplified by amplifier 22 whose output line 24 conducts the amplified scanner outputs as a serial signal to the recording device 26 (FIGURES 1 and 3) for recording the scan data on recording medium 12. It is not necessary to quantize the scanner output signals, and therefore, FIGURE 1 shows my system without quantizing, while FIGURES 2 and 3 have quantizer 28 interposed on line 24. Quantizer 28 can be conventional in which case it will automatically decide whether an input signal (from amplifier 22) originate from a "black" or "white" part of the area scanned. The quantizer output on line 24 reflects this decision for recordation on surface 12. By omitting quantizer 28 the recorded signal will be analog, i.e. proportional to the value of the signal on line 24 from amplifier 22; which is another way of saying that the recorded signal will correspond to the optical density of the unknown character or its background. Another alternative which is well suited for by machine (because only one quantizer is required) is to use a multilevel quantizer at 28 in FIGURE 3. A multilevel quantizer provides an excellent compromise between a true analog and pure, single threshold digital quantized system. For example, I can use the four level quantizer circuit disclosed in the S. Greenwald Patent No. 3,166,743 by connecting the two output wires thereof by means of a resistive coupling and use this as the quantizer output line 24. As in the Greenwald patent, the quantizer output signals to be recorded correspond to white, light gray and black respectively. In any case, the signals recorded on surface 12 form a full video representation of the unknown character and its background in a linear manner (with the slices, as detected by the successive scan lines, recorded end-to-end).

FIGURE 5 schematically shows the signals recorded on medium 12 when the character "1" shown in FIGURE 4 has been scanned. Thus, the six scans *a–f* are identified in FIGURE 5. The dark areas represent recorded signal corresponding to the "black" of the "1." During scan "*a*" only the character background is detected by photocell 20 and therefore "no" signal is shown recorded for scan "*a*" in FIGURE 5. But it is understood that various signal recording conventions are completely equivalent, such as recording a signal only when "white" is detected; recording signals only when "black" is detected; or recording signals for both "white" and "black" but having the signals distinguishable about any selected reference. Although I discuss only "black" and "white" recorded signals, it is understood that in my analog embodiment the recorded signal values will correspond to the entire gray scale (FIGURE 7, described later), and multilevel quantizing will cause the gray scale to be represented in a plurality of discrete steps.

Study of FIGURE 5 will show that during scan *b*, at positions 5, 10 and 11, "black" was detected and serially recorded. During scan *c* "black" was recorded when positions 4 and 11 were reached by the scan hole as it vertically traversed the image of the "1" in FIGURE 4. In a like manner recordings for scans *d–f* can be followed in FIGURES 4 and 5 of the drawings.

As the recording medium passes by the read members 32, they detect the recorded "white" and "black" signals (or "gray," or lack of singals as described before) and provide concurrent outputs on a plurailty of individual lines in cables 46, 47, 48, 49, 50 and 51. I have shown (FIGURE 2) six individual groups of read members 32, and as shown in FIGURE 5, each group has nine heads, probes, etc., the nature of which will depend on the type of recording, as discussed later. The first group of nine (or more, or fewer) probes, heads, etc., shown to the left of FIGURE 5, is used for developing the "read" trigger signal on line 40. The remaining groups of members 32 are used to provide signals for identifying the characters. Thus, in the reading example under consideration I extract information pertaining to forty five points from the matrix shown in FIGURE 4 which is sufficient to identify the characters of the set in a five-by-nine font. The forty five points are given by way of example only, it being understood that I can extract information pertaining to a larger number of points for greater resolution. When the space around the medium 12 is fully occupied with members 32 and I desire greater use of the recorded data (i.e. higher resolution), I can install one or more additional sets of members 32 along side of the illustrated members 32 and have them slightly lag or lead the illustrated members 32.

The six illustrated members 32 (FIGURES 2 and 5) are each constructed to be compatible with the kind of recording on medium 12. For electrostatic recording the medium is a suitable dielectric film. The recording head 26 is a probe, knife edge or other suitable corona-discharge device capable of depositing electrostatic charges as known in the art, e.g. is described in C. V. Anderson's Recording-Reproducing System using Dielectric Storage Medium, University of California, 1955. Each reading member 32 has a plurality of suitable electrostatic reading elements as bars, wires 33 (FIGURE 3), probes **33*a*** (FIGURE 3*a*) or the equivalent mounted on plug-boards 35 (FIGURE 3) or the like held in a stationary support 37.

My system would appear to be ideal for magnetic recording but certain difficulties are encountered in using commercially available reading heads a part of members 32. The serial recording of scan outputs on a mangetic medium can be accomplished wthout difficulty because only one magnetic recording head is required as the recording device 26. But, readout becomes a problem since commercially available magnetic heads are of the order of ⅜" to ¾" measured in the direction of travel of the recording medium (parallel to the head gap). Thus, conventional magnetic recording heads can only be stacked about two per inch; and in the reading example considered herein, my members 32 require a total of forty five adjacent heads. As a result, the diameter of the scan disc-drum combination would be too great and/or the peripheral speeds enormous. Therefore, I designed a magnetic head **33*b*** (FIGURE 3*b*) which can be constructed very short (measured in the direction of travel of the medium). For example the head length can easily be as small as 0.015 to 0.030 inch. Essentially, head **33*b* is constructed of a very thin U shaped flux-conductive member defining a flux gap at the free ends thereof, and having a flat winding 33** around the connected ends. Such heads are described more fully in application Serial No. 276,359. (The reading heads of FIGURES 3*c* and 3*d* are described later.)

Regardless of the kind of recording used (e.g. magnetic or electrostatic) or whether or not the recorded information is analog or quantized to one or more levels, each read member 32 has a complement output amplifier 58 (FIGURE 7) or the equivalent connected therewith, i.e. an amplifier providing distinguishable outputs on two lines which correspond to the input signal. For instance, if the output signal is +6 volts on one line, the amplifier will concurrently provide an output singal of —6 volts on the other line. In essence, amplifier 58 is made of two amplifiers (FIGURES 3, 3*a* and 3*b*) 59 and 60 where one of the amplifiers 60 is an inverting amplifier. The same effect is obtained (FIGURE 3*d*) in a magnetic head **38*d* (winding only shown) with a center-tapped winding, with the winding ends connected to separate amplifiers as shown. Thus, the two available output signals on lines 62 and 64 will be the complements of each about any reference e.g. zero volts. As disclosed in application Patent No. 3,104,369 the complementary outputs are used as "assertions" and "negations." With the "assertions" and "negation" signals available from all of the points established by the probes, heads, etc., of members 32, the signals can be logically combined (described later in connection with FIGURE 7) by a separate correlation device 34, such as a resistor adder, for each unknown character. Weighting can be obtained exactly as disclosed in Patent No. 3,104,369, i.e. by selection of values of the resistors in the correlation devices 34**.

Considerable simplification can be achieved (FIGURE 3*c*) by threading a correlation wire **34*c* through each selected reading head 33*c*, 33*e*, 33*f*, etc. (only three of the required forty five in the reading example are shown). There will be one such wire 34*e* for each character of the set, and the "assertion's" and "negations" are provided by the direction of the windings, e.g. compare the windings on heads 33*c* and 33*f*. Weighting is obtained by additional turns in the winding as on head 33*e*. In this embodiment the correlation wire 34*e* replaces the correlation device 34 (FIGURES 1 and 7), and has the advantage of requiring only one amplifier 58*c* for each character to be identified. Amplifier 58*c* amplifies the summarized signal on line 34*c*, and provides an amplified correlation signal on line 36*c* which corresponds, for example, to the signal on lines 36** of FIGURE 1.

Ordinary digital techniques in reading the recorded information from medium 12 cannot be used when the record contains continuously recorded analog singals as opposed to binary bits. For instance, the recorded information in FIGURE 5 is in the form of end-to-end slices of the character "1," but digital reading relies on the polarity of bits detected by changes in flux with respect to time as they are being read. Thus, as the signal (FIGURE 5) recorded for scan *d*, positions 3–11, is detected by the adjacent heads, no concurrent accurate signals from all of the pertinent heads could be obtained. The same problem exists with electrostatic recording.

There are many ways to overcome this problem, and one way is to use any of the known audio recording methods (as amplitude or frequency modulation, with or without a carrier or bias) and rely on diode detection or the equivalent for read-out with my heads. Another way to overcome the problem is to flux responsive (for example, Hall effect) heads. Another way is to use integrating amplifiers with the read heads. These methods are particularly attractive because they will faithfully produce analog signals from the recording. Another alternative is to use a simple logic circuit with each read head (FIGURES 5*a* and 5*b*). These figures show a wave form produced as the record of scan *d*, positions 3–11 (FIGURE 5) pass one read head **33*b*** (FIGURE 5*b*). The amplified positive-going outputs on lines 62, 64 are used to set a bistable device (as flip flop 100) which responds only to positive signals. Thus, the flip flop is set at the beginning of the signal (at P) the flip flop remains "on" until the end of the signal (FIGURE 5*a*) at which the trailing edge (positive-going) signal P–1 turns off (resets) the flip flop. The flip flop has two output lines **62*a* and 54*a* which concurrently provide complemental output signals which are inverse of each other in the two stable states of flip flop. Flip flop 100** can be constructed in numerous ways forming no part of my invention, e.g. as disclosed in Patent No. 3,182,205.

As mentioned before, many difficulties are overcome if the scan pattern is very fine i.e. there are more than the minimum number of vertical scans to define the character (FIGURE 4), and the scan elements of adjacent vertical scans overlap as shown in FIGURE 6. The effect of this is shown by the recordation of the analog signals in FIGURE 7. It is emphasized that the signals shown in FIGURE 7 are given by way of example only. For instance, during scan *d*–1 (FIGURE 6) the scan hole covers about ⅔ of the vertical feature of the character "1." Thus, if "total black" is assumed to be represented by the recorded signal of +6 volts; during scan *d*–1, when the scan hole 10*a* straddles the character feature as shown, the recorded signal will be +4 volts. During the motion of scan element 10*b* over the same character feature it is centered on the feature so that the amplified output from photocell 20 will be recorded as a +6 volt signal. Then, during scan *d*–3 where slightly more than ⅔ of the scan hole covers the character feature, the recorded signal will be +5 volts. Thus, in the design of the reading machine, the spacing of the members 32 (or heads 33*c*) will take into account the fact that only one of each group of three scans will provide the maximum recorded signal (the members 32 of FIGURE 5 will be horizontally spread).

The typical correlation device 34 shown in FIGURE 7 (there being at least one correlation device for each character of the set to be identified) is constructed as follows. The assertion wires from each "black"-expected point (from cables 47–51 in FIGURE 5) are connected to resistors of a resistor adder. For the character "1" the designations of specific wires in FIGURE 7 are correct. The negation wires 64 from points expected to be "white" for identity of a given character, are also connected to resistors of the resistor adder. Emphasis can be placed on specific, more important points by reducing the value of the resistor associated with the given points. It is understood that the resistor adders for each of the remaining characters of the set are designed (as implied in FIGURE 5) by proper selection of assertion and negation wires 62, 64 from the various cables 47–51.

The "read" trigger signal on line 40 can be provided in several ways, and I have illustrated one simple method. The member 32 to the extreme left of FIGURE 5 has amplifiers designed to provide an output signal when the recorded information for a complete scan corresponds to "white." Thus, by AND gating at 88, when the head elements of member 32 detect a recording on medium 12 which corresponds to the clear white space between adjacent printed characters, a "read" trigger signal is conducted on line 40 which is the output of the AND gate 88. Obviously, if the comparator will accept only a pulse for a trigger signal, a one shot multivibrator or the like can be interposed in line 40.

FIGURE 8 shows a modification where medium 12*a* is a tape of a suitable dielectric (or magnetic) material, instead of a film on a disc (not shown) or on a drum as in FIGURE 3. No difficulties are encountered in erasing information from a magnetic medium. However, for electrostatic recording the erase device 90 (FIGURE 2) can be somewhat critical, using ordinary electrostatic erase methods (contacting surface connected to ground, an opposite-polarity bias, flame, etc.). Thus, in FIGURE 8, I show a housing 92 containing a plurality of conductive contacting rollers engaging the surface of medium 12*a* and establishing a long, good ground connection (or an erasing bias potential connection) with the tape. I can also use housing 92 for confining an aqueous, alcohol, etc. atmosphere to promote discharge of the medium, or it can contain an alpha particle discharge device.

It is understood that numerous changes can be made without departing from the protection of the following claims.

I claim:

1. In a character reading machine to identify the characters of a set, scanning means to scan an unknown character of the set by a succession of adjacent scans covering the area of the unknown character, said scanning means including a rotary member on which the image of a character is adapted to be projected, and a photocell providing analog outputs corresponding to the optical density of the area covered by said scans, a mechanical storage device rigidly fixed to said rotary member thereby being rigidly synchronized with said scanning means, means responsive to said outputs for conducting signals corresponding to said outputs to said storage device for serial storage in a manner such that the stored signals are arranged as colinear representations of said scans as the character image is being scanned by said rotary member, a plurality of reading means colinearly positioned in confronting relationship with the surface of said storage device for concurrently reading said stored signals and providing new signals on a plurality of conductors, there being a number of reading means sufficient to provide new signals on separate conductors to identify all of the characters of said set, interpreter means for each character of said set, and preselected conductors connecting said reading means with said interpreter means in a manner such that said interpreter means respond to the stored signals of said storage device corresponding to the individual characters of the set.

2. The character reading machine of claim 1 wherein said rotary member is an apertured disc, and said mechanical storage device includes a drum fixed at the edge of said disc.

3. The reading machine of claim 1 wherein said means responsive to said analog outputs include a quantizer whose output signals correspond to at least three discrete levels of optical density of the elements of the character.

4. The reading machine of claim 1 wherein said reading means include a plurality of reading elements arranged side by side and adjacent to said recording medium, and means removably mounting said reading elements.

References Cited by the Examiner

FOREIGN PATENTS 1,303,517 8/1962 France.

DARYL W. COOK, *Acting Primary Examiner.*

MALCOLM A. MORRISON, *Examiner.*

J. E. SMITH, *Assistant Examiner.*